United States Patent [19]

Nishikori

[11] Patent Number: 4,614,510
[45] Date of Patent: Sep. 30, 1986

[54] POLYURETHANE TOOTHED BELT STRUCTURE

[75] Inventor: Yoji Nishikori, Komaki, Japan
[73] Assignee: Mitsuboshi Belting Ltd., Kobe, Japan
[21] Appl. No.: 709,541
[22] Filed: Mar. 8, 1985
[51] Int. Cl.[4] .............................................. F16G 1/28
[52] U.S. Cl. .................................................. 474/205
[58] Field of Search ....................... 474/204, 205, 250

[56] References Cited

U.S. PATENT DOCUMENTS 2,988,925  6/1961  Sauer .................................. 474/205
4,283,184  8/1981  Berg ................................... 474/203

FOREIGN PATENT DOCUMENTS 2116287  9/1983  United Kingdom ............... 474/205

Primary Examiner—James A. Leppink
Assistant Examiner—Frank McKenzie
Attorney, Agent, or Firm—Wood, Dalton, Phillips, Mason & Rowe

[57] ABSTRACT

A drive system having a toothed pulley and a cooperating toothed power transmission belt wherein the teeth of the belt are provided with transverse slots opening inwardly through the center of the tip of the tooth. The teeth are formed of resilient material, permitting the teeth to be constricted longitudinally as an incident of engagement thereof with the pulley to substantially close the slot in the engaged relationship with the pulley, thereby substantially eliminating backlash between the belt teeth and the pulley teeth, while effectively eliminating tooth deflection.

19 Claims, 9 Drawing Figures

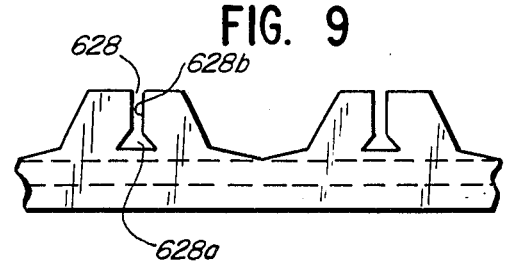
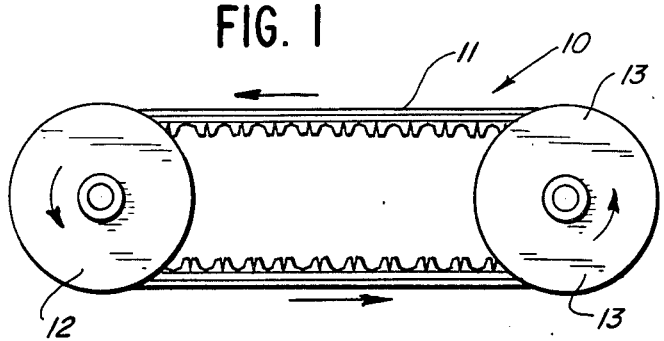
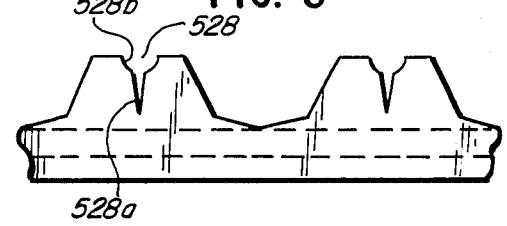
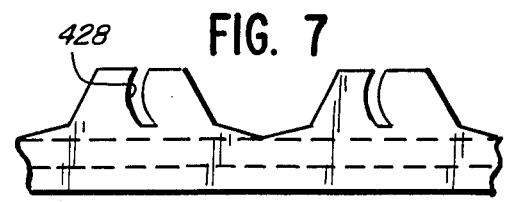
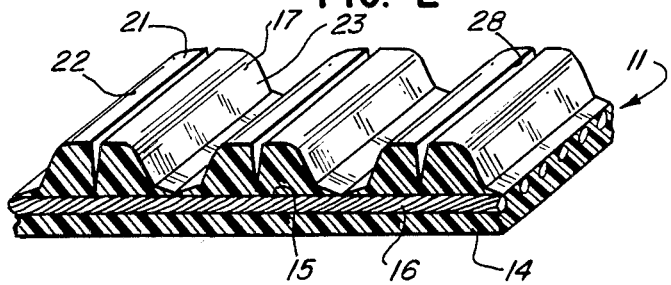
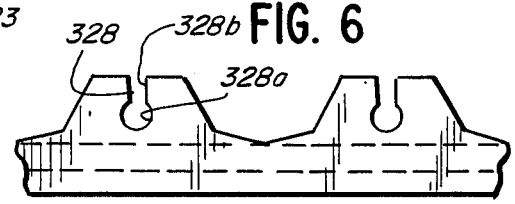
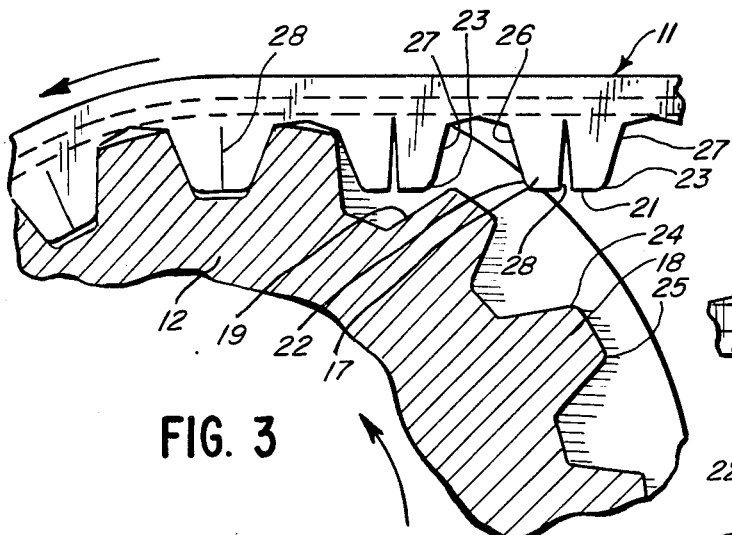
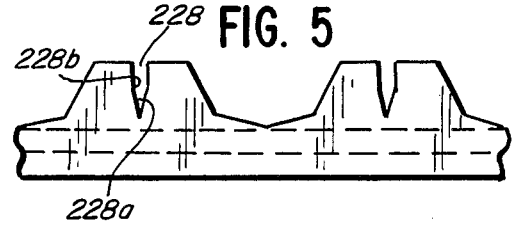
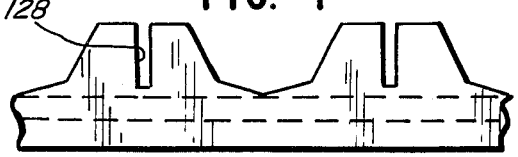

POLYURETHANE TOOTHED BELT STRUCTURE

TECHNICAL FIELD

This invention relates to power transmission systems and in particular to such systems utilizing toothed belt and pulley means.

BACKGROUND ART

Toothed power transmission belts are finding increasing usage in applications, such as office printing devices, including printers and facsimile reproducers.

With the toothed drive belts of the prior art, problems arise at times in the failure of the mechanism to maintain the printed lines straight. It has been found that such improper prints results from belt deflection in engaging with and disengaging from the drive pulleys.

One attempted solution to this vexatious problem has been to provide increased tension in the belt. Another attempted solution is to arrange the belt and pulley so as to have substantially no backlash. These attempted solutions, however, are not fully satisfactory, as they adversely affect the durability and life of the belt as well as raising problems in dumping of the teeth from the pulley, particularly where the backlash is attempted to be eliminated.

The provision of toothed belts in power transmission provides for synchronized driving between elements of the mechanism. Such synchronized driving is highly desirable in the robot industry wherein accurate correlation between the disposition of different parts of the mechanism must be maintained.

In order to provide more smooth engagement and disengagement between the belt and the pulley teeth, it has been considered desirable to provide backlash therebetween. On the other hand, such backlash permits deflection of the teeth of the belt during such engagement and disengagement relative to the pulley, tending to wear the teeth and tend to separate the teeth from the belt body after a relatively short period of use.

DISCLOSURE OF INVENTION

The present invention comprehends an improved toothed belt construction which provides the highly desirable backlash-free engagement of the belt teeth with the pulley, while at the same time effectively eliminating undesirable deflection of the teeth in engaging with and disengaging from the pulley in the normal operation of the drive system.

More specifically, the invention comprehends providing for use in such a drive system an improved toothed power transmission belt construction wherein the teeth of the belt are each provided with a transverse slot opening inwardly through the center of the tip of the tooth.

The teeth are formed of a resilient material, permitting the teeth to be constricted longitudinally as an incident of engagement thereof with the pulley to substantially close the slots during engagement of the pulley teeth with the pulley.

In the illustrated embodiment, the longitudinal width of the belt teeth is greater than the longitudinal width of the pulley grooves when the belt teeth are spaced from the pulley, with the difference in the width being taken up by the closing of the slots when the belt teeth are engaged with the pulley teeth in the pulley grooves, as discussed above.

The improved belt tooth construction permits engagement and disengagement of the belt relative to the pulley without substantial deflection thereof, thereby assuring long, troublefree life of the belt.

When the belt teeth are constricted so as to close the slots thereof, the belt teeth have a longitudinal width substantially equal to that of the grooves between the pulley teeth, whereby backlash is effectively eliminated so as to provide an improved synchronized relationship between the different parts of the drive system.

The invention comprehends the use of slots having a wide range of cross-sectional configurations.

In the illustrated embodiment, the slots extend outwardly to adjacent the tensile cord in the belt body.

In the illustrated embodiment, the belt teeth are formed integrally with the belt body, as by molding the belt of a suitable synthetic resin, such as polyurethane.

The power transmission belt and drive system of the present invention are extremely simple and economical of construction while yet providing the highly desirable features discussed above.

BRIEF DESCRIPTION OF THE DRAWING

Other features and advantages of the invention will be apparent from the following description taken in connection with the accompanying drawing wherein:

FIG. 1 is a schematic elevation illustrating the use of a power transmission belt embodying the invention in a drive system utilizing a pair of pulleys;

FIG. 2 is a fragmentary sectional perspective view of a portion of the toothed belt embodying the invention;

FIG. 3 is a fragmentary side elevation illustrating the arrangement of the belt and pulley in greater detail;

FIG. 4 is a fragmentary side elevation illustrating another form of toothed belt embodying the invention;

FIG. 5 is a fragmentary side elevation illustrating still another form of toothed belt embodying the invention;

FIG. 6 is a fragmentary elevation illustrating yet another form of toothed belt embodying the invention;

FIG. 7 is a fragmentary side elevation of still another form of toothed belt embodying the invention;

FIG. 8 is a fragmentary side elevation of yet another form of toothed belt embodying the invention; and FIG. 9 is a fragmentary side elevation of still another form of toothed belt embodying the invention.

BEST MODE FOR CARRYING OUT THE INVENTION

In the illustrative embodiment of the invention as disclosed in the drawing, a drive system generally designated 10 is shown to comprise a toothed belt/pulley drive system including a toothed power transmission belt 11, a complementary toothed drive pulley 12, and a complementary toothed driven pulley 13.

The power transmission belt 11, as best seen in FIG. 2, includes a looped belt body 14 defining an inner portion 15. A plurality of longitudinally extending tensile cords 16 are embedded in the body 14 in the conventional manner. More specifically, the tensile cords comprise low elongation, high strength cords which illustratively may be formed of polyester, aliphatic polyamide, aromatic polyamide (such as KEVLAR), synthetic resins, glass fiber, and metal wire ropes.

As further shown in FIG. 2, the power transmission belt further includes a longitudinally extending series of teeth 17 projecting inwardly from the inner portion 15 of the belt body, with a preselected pitch corresponding to the pitch of a complementary set of teeth 18 on each of the pulleys 12 and 13 (see FIG. 3).

As further seen in FIG. 3, the belt teeth 17 are generally complementary to the grooves 19 between the teeth 18 of the pulleys, and the pulley teeth 18 are generally complementary to the grooves 20 between the teeth 17 of the belt.

As shown in the drawing, the distal tip 21 of the teeth 17 is planar and the opposite leading and trailing edges 22 and 23 respectively, of the tip are segmentally cylindrically arcuate. The pulley teeth define leading and trailing distal corner portions 24 and 25 respectively, which, as seen in FIG. 3, engage the sidewalls 26 and 27 of the belt teeth at the time of engagement and disengagement of the belt teeth relative to the pulley.

Each of belt teeth 17 is provided with a transverse slot 28 which opens inwardly through the center of the tooth tip 21. The teeth are preferably formed of a resilient material, permitting the teeth to be constricted longitudinally as an incident of engagement thereof with the pulley teeth to substantially close the slots when the belt teeth are fully received in the pulley grooves, as illustrated in the left portion of FIG. 3.

As illustrated in FIG. 3, in the operation of the drive system, the leading corner portion 24 of the pulley tooth 18 engages the trailing sidewall surface 27 of the belt tooth 17 partially received in the pulley groove 19. At the same time, the trailing corner portion 25 of the pulley tooth received in the belt groove 20 engages the leading sidewall surface 26 of the belt tooth moving into the pulley groove. The cooperating action of the preceding tooth trailing corner portion 25 and the succeeding tooth leading corner portion 24 on the belt tooth moving into the pulley groove 19 causes the slot 28 to close.

Thus, while the longitudinal width of the belt teeth in the free disposition spaced from the pulley is greater than the width of the pulley grooves 19, when the belt teeth are fully received in the pulley grooves, with the space previously defined by the slot 28 closed, the width of the belt teeth is substantially equal to the width of the pulley grooves so as to provide a backlash-free engagement between the belt teeth and the pulley, providing improved positive synchronization of the drive system illustrated in FIG. 1.

As illustrated in FIG. 3, the belt teeth are not deflected bodily on the belt body as a result of the engagement with and disengagement from the pulley, but rather, are simply constricted and relaxed so as to close and open the slots in providing the desired backlash-free engagement of the teeth with the pulley in the operation of the drive system. By eliminating the backlash, the power transmission between the belt and pulley is effected without deflection of the teeth relative to the belt body, thereby providing long, troublefree life of the belt.

As shown in FIG. 2, the slots 28 may extend to substantially adjacent the tensile cords 16. In the preferred embodiment of the invention, the slots define inwardly widening, triangular longitudinal cross sections.

The invention comprehends, however, that the slots may have any one of a plurality of different cross-sectional configurations, as illustrated in FIGS. 4–9 respectively. FIGS. 4–9 are illustrative only and are not to be considered as limiting the possible range of cross-sectional configurations contemplated within the broad scope of the invention.

Briefly as shown in FIG. 4, a modified form of belt tooth slot 128 is shown to comprise a slot which is rectangular in longitudinal cross section.

In FIG. 5, another form of slot 228 is shown to comprise a slot which is needle-shaped, having an inwardly widening triangular inner portion 228a and a rectangular outer portion 228b.

In FIG. 6, still another form of slot 328 is shown to comprise a keyhole-shaped slot having a segmentally cylindrical inner portion 328a and a rectangular outer portion 328b.

In FIG. 7, still another form of slot configuration is shown to comprise a slot 428 which is arcuate in longitudinal cross section.

In FIG. 8, a slot generally designated 528 is shown to include a triangular, inwardly widening inner portion 528a and a segmentally cylindrical inwardly widening outer portion 528b.

Still another form of slot is illustrated in FIG. 9 to comprise a slot 628 having a dovetail configuration including an inwardly narrowing triangular inner portion 628a and a rectangular outer portion 628b.

In each of the different embodiments, the constrictibility of the belt tooth permitted by the width of the slot, permits the tooth to correspond accurately to the width of the pulley groove when the tooth is fully received in the pulley groove so as to eliminate backlash therebetween. The teeth and body belt may be integrally formed as by molding the belt of a suitable synthetic resin, such as polyurethane. The elasticity of the resilient polyurethane belt teeth permits the closing of the slot with relatively small pressure against the sidewalls of the belt teeth by the pulley corner portions 24 and 25, as discussed above.

The invention further comprehends, in addition to the straight tooth configuration of the belt and pulley teeth, the use of curved teeth, such as involuted teeth.

It has been found that by providing the slotted teeth, the flexibility of the belt is substantially improved and effectively eliminates breaking of the teeth free from the belt body, notwithstanding the application of relatively high transmission forces between the belt teeth and pulley teeth in operation of the drive system. Further, it has been found that by virtue of the stabilized engagement and disengagement of the belt teeth relative to the pulley, substantial noise reduction is obtained, providing further improved use of the belt in quiet environments, such as in the driving of office machines and the like.

I claim:

1. A toothed power transmission belt for use in a drive system having a pulley, said belt comprising:
    a looped body provided with longitudinally extending tensile cord means and defining an inner portion; and
    a longitudinally extending series of teeth projecting inwardly from said inner portion of the body with a preselected pitch, each tooth being provided with a transverse slot opening inwardly through the center of the tip of the tooth, said slot being keyhole-shaped in longitudinal cross section, said teeth being formed of a resilient material permitting the teeth to be constricted longitudinally thereof with the pulley to substantially close said slot.

2. A drive system having a toothed pulley and a cooperating toothed power transmission belt, wherein said pulley comprises a pulley having outwardly projecting pulley teeth defining grooves therebetween, and said belt comprises a looped body provided with longitudinally extending tensile cord means, and defining an inner portion and a longitudinally extending series of belt teeth projecting inwardly from said inner portion of the body with a preselected pitch, each belt tooth being provided with a transverse slot opening inwardly through the center of the tip of the belt tooth, said slot being keyhole-shaped in longitudinal cross section, the longitudinal width of the belt teeth being greater than the longitudinal width of said pulley grooves when the belt teeth are spaced from the pulley, said belt teeth being formed of a resilient material permitting the belt teeth to be constricted longitudinally as an incident of engagement thereof with the pulley teeth in said grooves to substantially close said slot and thereby substantially eliminate backlash between the belt teeth and the pulley teeth.

3. A toothed power transmission belt for use in a drive system having a pulley, said belt comprising:
  a looped body provided with longitudinally extending tensile cord means and defining an inner portion; and
  a longitudinally extending series of teeth projecting inwardly from said inner portion of the body with a preselected pitch, each tooth being provided with a transverse slot opening inwardly through the center of the tip of the tooth, said teeth being formed of a resilient material permitting the teeth to be constricted longitudinally as an incident of engagement thereof with the pulley to substantially close said slot, said slot being inwardly widening triangular in longitudinal cross section.

4. A toothed power transmission belt for use in a drive system having a pulley, said belt comprising:
  a looped body provided with longitudinally extending tensile cord means and defining an inner portion; and
  a longitudinally extending series of teeth projecting inwardly from said inner portion of the body with a preselected pitch, each tooth being provided with a transverse slot opening inwardly through the center of the tip of the tooth, said teeth being formed of a resilient material permitting the teeth to be constricted longitudinally as an incident of engagement thereof with the pulley to substantially close said slot, said slot extending arcuately inwardly.

5. A toothed power transmission belt for use in a drive system having a pulley, said belt comprising:
  a looped body provided with longitudinally extending tensile cord means and defining an inner portion; and
  a longitudinally extending series of teeth projecting inwardly from said inner portion of the body with a preselected pitch, each tooth being provided with a transverse slot opening inwardly through the center of the tip of the tooth, said teeth being formed of a resilient material permitting the teeth to be constricted longitudinally as an incident of engagement thereof with the pulley to substantially close said slot, the longitudinal width of said slot increasing inwardly.

6. A drive system having a toothed pulley and a cooperating toothed power transmission belt, wherein said pulley comprises a pulley having outwardly projecting pulley teeth defining grooves therebetween, and said belt comprises a looped body provided with longitudinally extending tensile cord means, and defining an inner portion and a longitudinally extending series of belt teeth projecting inwardly from said inner portion of the body with a preselected pitch, each belt tooth being provided with a transverse slot opening inwardly through the center of the tip of the belt tooth, the longitudinal width of the belt teeth being greater than the longitudinal width of said pulley grooves when the belt teeth are spaced from the pulley, said belt teeth being formed of a resilient material permitting the belt teeth to be constricted longitudinally as an incident of engagement thereof with the pulley teeth in said grooves to substantially close said slot and thereby substantially eliminate backlash between the belt teeth and the pulley teeth, said slot being inwardly widening triangular in longitudinal cross section.

7. The power transmission structure of claims 3 or 6, wherein said slot extends substantially the full height of the tooth.

8. The power transmission structure of claims 3 or 6 wherein said slot is inwardly narrowing triangular in longitudinal cross section at an outer end and rectangular at an inner end.

9. The power transmission structure of claims 3 or 6 wherein the longitudinal width of the slot at an inner end thereof is greater than the longitudinal width of the slot at an outer end thereof.

10. The power transmission structure of claims 3 or 6 wherein said center of the tooth tip is planar.

11. The power transmission structure of claims 3 or 6 wherein said body and teeth are formed integrally of molded synthetic resin.

12. The power transmission structure of claims 3 or 6 wherein said body and teeth are formed integrally of polyurethane.

13. The power transmission structure of claims 3 or 6 wherein said slot extends substantially the full height of the tooth substantially to said tensile cord means.

14. The power transmission structure of claims 3 or 6 wherein the longitudinal extent of each belt tooth face is larger than the corresponding dimension of the roots of the pulley grooves.

15. A drive system having a toothed pulley and a cooperating toothed power transmission belt, wherein said pulley comprises a pulley having outwardly projecting pulley teeth defining grooves therebetween, and said belt comprises a looped body provided with longitudinally extending tensile cord means, and defining an inner portion and a longitudinally extending series of belt teeth projecting inwardly from said inner portion of the body with a preselected pitch, each belt tooth being provided with a transverse slot opening inwardly through the center of the tip of the belt tooth, the longitudinal width of the belt teeth being greater than the longitudinal width of said pulley grooves when the belt teeth are spaced from the pulley, said belt teeth being formed of a resilient material permitting the belt teeth to be constricted longitudinally as an incident of engagement thereof with the pulley teeth in said grooves to substantially close said slot and thereby substantially eliminate backlash between the belt teeth and the pulley teeth, said slot extending arcuately inwardly.

16. A drive system having a toothed pulley and a cooperating toothed power transmission belt, wherein said pulley comprises a pulley having outwardly projecting pulley teeth defining grooves therebetween, and said belt comprises a looped body provided with longitudinally extending tensile cord means, and defining an inner portion and a longitudinally extending series of belt teeth projecting inwardly from said inner portion of the body with a preselected pitch, each belt tooth being provided with a transverse slot opening inwardly through the center of the tip of the belt tooth, the longitudinal width of the belt teeth being greater than the longitudinal width of said pulley grooves when the belt teeth are spaced from the pulley, said belt teeth being formed of a resilient material permitting the belt teeth to be constricted longitudinally as an incident of engagement thereof with the pulley teeth in said grooves to substantially close said slot and thereby substantially eliminate backlash between the belt teeth and the pulley teeth, the longitudinal width of said slot increasing inwardly.

17. The power transmission structure of claims 5 or 16 wherein said slot is needle-shaped in longitudinal cross section.

18. The power transmission structure of claims 5 or 16 wherein said slot is inwardly widening triangular in longitudinal cross section at an outer end, and inwardly widening segmentally cylindrical at an inner end.

19. The power transmission structure of claims 5 or 16 wherein said tooth tip is rounded at the leading and trailing edges thereof, and said center of the tooth tip is planar.

* * * * *